C. F. WASHBURN.
STORAGE BATTERY.
APPLICATION FILED AUG. 12, 1909.
962,870. Patented June 28, 1910.
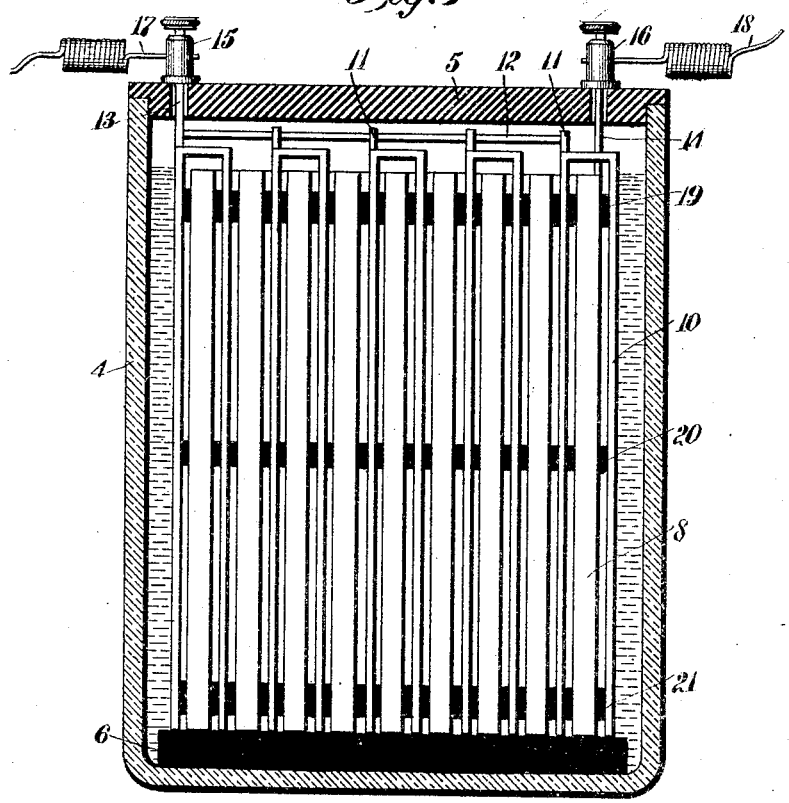
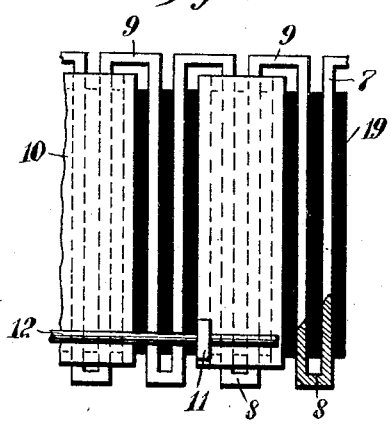
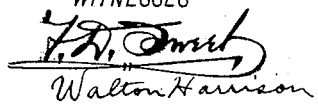
WITNESSES
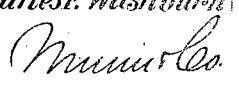
INVENTOR
Charles F. Washburn
BY
ATTORNEYS

UNITED STATES PATENT OFFICE.

CHARLES FREDERICK WASHBURN, OF NEW LONDON, CONNECTICUT.

STORAGE BATTERY.

962,870.  Specification of Letters Patent.  Patented June 28, 1910.

Application filed August 12, 1909. Serial No. 512,528.

*To all whom it may concern:*

Be it known that I, CHARLES F. WASHBURN, a citizen of the United States, and a resident of New London, in the county of New London and State of Connecticut, have invented a new and Improved Storage Battery, of which the following is a full, clear, and exact description.

My invention relates to storage batteries, my more particular purpose being to lessen the weight thereof by providing plates made of such materials and having such form as to provide a maximum of efficiency coupled with a minimum of weight.

My improved battery is based, to some extent, on the principle that the negative pole electrode, particularly if used in connection with a positive pole electrode of lead or of a material in which lead predominates, may be made very thin and light provided it has a sufficient extent of surface exposed to the connection of the battery liquid. What I seek to do, therefore, is to provide a positive pole electrode made of lead and formed preferably of a single strip bent back upon itself, as hereinafter described, and formed in any suitable manner, preferably by the action of the current, and in connection with this electrode I provide a negative pole electrode consisting of a number of separate plates of aluminum which may be plated with various other metals and having such form as to expose a very large surface.

Since aluminum is a very light metal, the weight of the battery as a whole is very materially reduced by the use of the negative pole electrode made largely or completely of aluminum.

For the positive pole electrode I find it convenient to first produce a plain lead plate and use it in connection with the cathode to form its lead plate by aid of a battery current. That is to say, by repeatedly charging and discharging the battery, the plate originally consisting of entirely metallic lead is gradually rendered spongy and porous in character and is also gradually converted into lead peroxid, the outermost portions being effected first as in other battery plates of this general type. I find a very convenient way to proceed is to connect up the plates with a dynamo and send the current through the battery, say for two or three hours, the lead anode thereby becoming covered with a film of lead peroxid, and the aluminum plate becoming coated superficially with a film of spongy metal. In this condition the battery will retain a considerable quantity of electricity and give the same forth as soon as the dynamo is disconnected and the proper circuit completed.

I have discovered that if the positive pole electrode has considerable storage capacity or, in other words, if the positive pole electrode be made for instance of lead peroxid or other material which in other batteries is suitable for holding a considerable quantity of energy, the negative pole electrode may be made comparatively light provided it have a large superficial area. It seems, following this line of reasoning, that the quantity of electricity given forth by the battery does not depend so much on the thickness of the negative pole electrode as upon its superficial area, when this area is adequately balanced by a sufficient quantity of lead peroxid or analogous material in the positive pole electrode. Hence I save weight by making the negative pole electrode of light material and giving it a large superficial surface. I have also found that the durability and reliability of the battery may be increased within proper limits by giving to the plates the construction hereinafter described.

Reference is to be had to the accompanying drawings forming a part of this specification and in which like characters of reference indicate like parts in all the views.

Figure 1 is a vertical section through a cell of my improved battery, the electrode, however, being shown in elevation. Fig. 2 is a fragmentary plan view showing a portion of the positive pole electrode and a portion of the negative pole electrode, together with parts immediately associated therewith.

The battery cell is shown at 4 and is provided with a cover 5. Resting within the bottom of the cell is a top plate 6 of insulating material, preferably of rubber. The positive pole electrode is shown at 7 and consists of a strip of lead bent back upon itself so as to form a continuous member of sinuous form, the bends 8 and 9 being of different sizes in order to accommodate the negative pole electrode plates as hereinafter described. The negative pole electrode plates are shown at 10 and have much the form of an inverted U. These plates are of considerable width, as may be seen in Fig. 2, extending, as they do, nearly across the battery. Each plate 10 is provided with an ear 11 integral with it and extending upwardly, a rod 12 of metal being threaded through the several ears and used to maintain electrical communication between them. A conductor 14, integral with the positive pole electrode and forming practically a continuation of the same, extends upwardly through the cover 5. Another conductor 13, integral with one of the plates 10, extends upwardly through the cover 5. Binding posts 15, 16, are connected securely with the conductors 13, 14, and serve as the battery terminals which receive the wires 17, 18, for connecting the battery with any outside instrument, or circuit. At 19, 20, 21, are spacing strips made of rubber or other resilient insulating material. These spacing strips are fed into the bends 8, 9, and as the bends 9 are larger than the bends 8, they accommodate the downwardly-extending portions of the negative pole electrode plates 10. After the plates are made as above described and are connected together, being spaced by the spacing bars 19, 20, 21, the entire group of plates and spacing bars is subjected to compression and is placed in the cell 4, as shown in Fig. 1. If desired, rubber bands may be stretched around the outside of the plates so as to hold them together, although this is not absolutely necessary.

In assembling the parts, the negative pole electrode is first made in the form of a continuous strip which is bent back upon itself in so-called bellows folds, as indicated in Figs. 1 and 2, the spacing bars and the negative pole electrode plates being placed in position and held in place by the pressure of adjacent parts. As a battery fluid, I make use of the well-known fluids generally employed with a lead plate, or in any battery suitable for an aluminum plate used for a negative pole electrode.

Having thus described my invention, I claim as new and desire to secure by Letters Patent:

1. In a storage battery, a plate made of a strip of lead bent back upon itself so as to form bellows folds, and an aluminum plate bent back upon itself and extending into said folds.

2. In a storage battery, a lead plate bent back upon itself so as to form bellows folds, and a number of aluminum plates each of substantially U-form inserted partially into said folds, and spacing members disposed intermediate said lead plate and said aluminum plate.

3. In a storage battery, the combination of a battery plate bent back upon itself so as to form a sinuous member provided with bellows folds, some of which are larger than others, and a second plate provided with portions disposed among the largest of said bellows folds, and means for insulating said portions from said folds.

4. In a battery, the combination of a metallic plate bent back upon itself so as to form bellows folds, a number of other metallic plates, each of a substantially U form, inserted partially within said folds, and means for spacing said last-mentioned plates from said first-mentioned plate.

5. In a battery, a metallic plate of one sign bent back upon itself so as to form bellows folds, a number of other metallic plates, each of a sign differing from said first-mentioned sign, inserted partially within said folds, and spacing members disposed intermediate said first-mentioned plate and said last-mentioned plates.

In testimony whereof I have signed my name to this specification in the presence of two subscribing witnesses.

CHAS. FREDERICK WASHBURN.

Witnesses:
ALFRED COIT,
DONALD G. BOKINS.